United States Patent [19]

Dey et al.

[11] 4,037,025

[45] July 19, 1977

[54] HALOGEN FUELED ORGANIC ELECTROLYTE FUEL CELL

[75] Inventors: Arabinda N. Dey, Needham; Carl R. Schlaikjer, Arlington, both of Mass.

[73] Assignee: P. R. Mallory & Co., Inc., Indianapolis, Ind.

[21] Appl. No.: 299,557

[22] Filed: Oct. 20, 1972

[51] Int. Cl.$^2$ .............................................. H01M 8/00
[52] U.S. Cl. ...................................................... 429/29
[58] Field of Search ................... 136/86 A, 86 R, 154, 136/155, 83 R

[56] References Cited

U.S. PATENT DOCUMENTS

| | | | |
|---|---|---|---|
| 3,493,433 | 2/1970 | Hoffmann | 136/155 |
| 3,567,515 | 3/1971 | Maricle et al. | 136/154 |
| 3,573,105 | 3/1971 | Weininger et al. | 136/86 A |

*Primary Examiner*—John H. Mack
*Assistant Examiner*—H. A. Feeley
*Attorney, Agent, or Firm*—Ronald S. Cornell; Israel Nissenbaum; Charles W. Hoffmann

[57] ABSTRACT

A fuel cell is described comprising a halogen-fueled porous cathode, an active metal anode and an organic electrolyte having dissolved therein sulfur dioxide, to improve the solubility of the halogen fuel, to prevent passivation of the electrodes by the products of the reaction of the halogen with the active metal anode and to protect the active metal anode from reacting directly with the halogen dissolved in the electrolyte.

11 Claims, No Drawings

HALOGEN FUELED ORGANIC ELECTROLYTE FUEL CELL

FIELD OF THE INVENTION

This invention relates to fuel cells operable in nonaqueous media to produce electrical energy and more particularly, to fuel cell systems comprising active metal anodes, halogen-fueled cathodes and organic electrolytes.

BACKGROUND OF THE INVENTION

Active metal anodes are those anodic metals such as lithium, calcium, magnesium, aluminum, and the like which, in aqueous electrolytes corrode, explosively releasing hydrogen and forming corresponding metal hydroxides. The term active metals as used herein encompasses the group of metals which displace hydrogen from aqueous solutions. They are a useful class of active metal anodes and particularly useful of this class are the light metal anodes.

Light metal anodes with halogen cathodes form an interesting group of active materials for fuel cells and semifuel cells and are characterized by high voltages as will appear from the following table:

TABLE I
CALCULATED CELL VOLTAGES FOR DIFFERENT ACTIVE METAL ANODES AND HALOGEN CATHODE COUPLES

| CELL | CALCULATED CELL VOLTAGES (VOLTS) |
|---|---|
| Lithium-chlorine | 3.98 |
| Lithium-bromine | 3.52 |
| Lithium-iodine | 2.77 |
| Calcium-chlorine | 3.84 |
| Calcium-bromine | 3.40 |
| Calcium-iodine | 1.98 |
| Magnesium-chlorine | 3.04 |
| Magnesium-bromine | 2.58 |
| Magnesium-iodine | 1.85 |
| Aluminum-chlorine | 2.20 |
| Aluminum-bromine | 1.74 |

Based on the chemistry of the elements utilized in the cells listed in Table I, it is obvious, that when it is attempted to use aqueous electrolytes for these cells, there are serious limitations associated with the decomposition of water. For example, active anode materials such as lithium, calcium, magnesium and aluminum and the like, corrode in aqueous electrolyte systems, explosively evolving hydrogen in forming the corresponding metal hydroxides. On the other hand, the halogens, the cathode active fuels, react with aqueous electrolytes to form halogen compounds. For example, when the halogen is chlorine, the compounds formed are chlorides, hypochlorites, and chlorates, depending upon the pH and the temperature conditions. For these reasons, it has not been possible to develop aqueous electrolyte fuel cells embodying these elements.

To overcome the difficulties encountered with aqueous electrolytes, attempts have been made to develop cells utilizing the couples shown in Table I in molten salt media. Some success has been achieved in this direction. It is obvious however, that the operation of cells employing molten salt electrolytes requires high temperatures and thus the cells cannot readily function under room temperature conditions.

It has also been proposed to provide active metal halogen fuel cell systems utilizing nonaqueous, organic electrolytes so that the cells can be operated under room temperature conditions and in the absence of detrimental gas evolution. These nonaqueous organic electrolytes are based upon certain organic solvents in which ionizable salts have been dissolved to obtain electrical conductivity and electrode compatibity.

Among active metal anodes suitable for the purpose of the present invention are lithium, calcium, magnesium, aluminum, and the like. These may be used with or without amalgamation with mercury. The cathodes in such cells are halogens selected from the group consisting of chlorine, bromine, and iodine operating at porous, inert electrodes such as porous carbon or graphite or halogen permeable teflonized membranes.

The novel electrolytes employed for cells are based upon organic solvents such as dimethyl formamide, dimethyl sulfoxide, methyl and butyl formates, ethylene and propylene carbonate, gammabutyrolactone, and similar polar solvents. Also useful are ethers and esters such as tetrahydrofuran, 1,2- dimethoxy ethane, methyl and ethyl carbonates and acetates, and the like. In these solvents are dissolved inorganic ionizanble salts which are compatible with the halogen cathodes and the active metal anodes. Preferred are the halides such as the chlorides, bromides, and iodides; perchlorates; tetrachloroaluminates; tetrafluoroborates; hexafluorophosphates; and hexafluoroarsenates, of lithium, sodium, potassium, magnesium, or aluminum. In a presently available fuel cell of this type, halogens and active metals are utilized in a device wherein the halogens are reduced on a graphite cloth in an organic electrolyte to active metal halide salts. The halogen, therein described is admitted to the system from the outside and transferred to the graphite cloth element with appropriate hardware.

Several problems encountered with these fuel cells were circumvented by mechanical devices. The halogen dissolved in the organic solvent is led to the graphite cathode element for introduction into cells only at a rate corresponding to the rate of which it is being consumed by the electrochemical reduction within the cells. If this rate is exceeded there is a danger that the elemental halogen will enter into electrolyte and directly react with the anode metal. In addition, it was found that the active metal halide salt, produced at the graphite cathode element by reduction of the halogen, displayed only limited solubility in this solvent and tended to separate out on the graphite. This reduced the effective surface area of the cathode element caused rapid polarization during cell operation.

The present invention is directed to an improvement by which these among other difficulties may be overcome.

It is, therefore, an object of this invention to provide a novel electrolyte which permits the graphite fuel cell cathode elements, in which the halogen is reduced, to function without becoming fouled or coated with the salt formed as a product of the cell reaction.

It is a further object to provide a halogen-active metal fuel cell and an organic electrolyte which will permit the anode to function efficiently even though there may be unreacted halogen dissolved in the electrolyte.

THE INVENTION

These and other objects will be achieved by the present invention which is based upon adding to the electrolyte an additional solute, sulfur dioxide, which, when dissolved in the organic electrolyte greatly increases the solubility of the cell reaction products and prevents precipitation of such products on the graphite. By adding the sulfur dioxide to the electrolyte, the modified electrolyte has been found to protect the active metal anodes from reacting directly with any halogen which is dissolved in the electrolyte and yet does not hinder the electrochemical reduction of the halogen at the graphite surface of the cathode element.

The addition of sulfur dioxide according to this invention to the electrolyte thus affords two main improvements to the organic fuel cell:

1. the increased product solubility and thus a reduced passivization of the fuel cell cathode element by-product precipitation;
2. the protection of the anode metal from the cathode substance present in the electrolyte.

DETAILED DESCRIPTION OF THE INVENTION

The cathode active material is the fuel for the fuel cell of this invention, may be introduced into the fuel cell from an external source by leading to the hollow cathode element in the form of a gas when chlorine is used; in the form of a liquid when bromine is used; or in the form of a high vapor-pressure solid when iodine is used. Alternatively, the halogen may be predissolved or pre-dispersed in the electrolyte in the required quantity. The electrolyte which contains the previously described organic solvents with inorganic salts dissolved therein 0.25 to 2 M concentration and which is saturated with respect to said halogen, may be introduced through the pores of the cathode element.

The anodes may be constituted of various light metals such as lithium, calcium, magnesium and aluminum cut to proper dimensions for use as anodes from sheets of the metal. Or the anodes may be comprised of particles of the active metals compressed around and about and onto the surface of porous inert electroconductive metals such as stainless steel or nickel to act as current collectors. The anodes need not be formed of pure metals but may be alloys of the active metals, alloys of several of the active metals or alloys of the active metals containing elementary tin, zinc, antimony and the like. These metals or alloys, may be employed with or without amalgamation with mercury. Further, the anodes may be in the form of porous compacts, foils of any desired thickness, and they may be etched to provide increased surface area.

As the porosity of the cathode has a large influence on the performance, particularly as regards the circulation of the halogen, when dissolved in the electrolyte, it may be indicated that the porous carbon or graphite electrodes, comprising powder, fiber, or cloth with or without binder and having a porosity between 30% –80% may be employed. In place of porous carbon or graphite, permeable membranes consisting of teflon, with or without catalysts, may be used with equal or improved results. Porous tantalum electrodes may also be used.

The electrolyte according to the present invention comprises any of the polar organic solvents mentioned above alone or admixed in which solvent is dissolved at least one of the ionizable inorganic salts, previously mentioned, in amounts from 0.25 to 2 molar concentration. The resultant solution is then substantially saturated with respect to sulfur dioxide.

In general, it is preferred to prepare electrolytes according to this invention by dehydrating the organic solvent, suspending therein the desired amount of the electrolytically conductive inorganic salt and then introducing into said suspension the sulfur dioxide. The sulfur dioxide is passed into this suspension until substantial saturation is achieved. It has been noted that the surface tension of the resultant mixture decreases as the salt and the sulfur dioxide dissolve therein. The viscosity has also been noted to decrease.

Although the present invention has been disclosed in connection with preferred embodiments thereof variations and modifications may be resorted to by those skilled in the art without departing from principles of the invention. Thus for cells requiring limited operation, as in reserve cells, the halogens may be directly stored in contact with the electrodes and dissolved in the electrolyte or the electrolyte may be reserved in a separate container for introduction into the cell at the time of use.

A single cell according to this invention may comprise more than one anode and more than one cathode. It will be noted that while the halogen fuel is continuously introduced, the operation of the cells is limited by the amount of active metal anode present. However, such cells can be revived by the introduction of additional anode metal or the spent anode metal may be replaced with new anodes of the same active material. Further, if necessary, it may be desirable to add special means for the circulation and treatment of the electrolyte to remove therefrom accumulated reaction products.

Further, the cells of this invention may be arranged in series or parallel configurations to obtain batteries of desired voltage and capacity characteristics. All of those variations and modifications are considered to be within the true spirit and scope of the present invention as disclosed in the foregoing description and in the appended examples.

EXAMPLE 1

A mixture of equal volumes of ethylene carbonate and propylene carbonate was equilibrated overnight with a sufficient amount of dried molecular sieve, type 4 A, to remove moisture from the solvent pair. An infrared spectrum showed no absorption at 1600 cm$^{-1}$, where water would be expected to absorb. Forty ml. of this mixture were added to a 100 ml volumetric flask containing 13.3 g of lithium iodide. The salt was shown to be dry be analysis of the iodide content. A viscous suspension resulted, with the release of heat. Sulfur dioxide was passed into the suspension, during which time most of the salt dissolved, and the resultingsolution was reddish-orange. Solid iodine was added to the flask, alternating with the further addition of sulfur dioxide and 20 more ml. of dry propylene carbonate. The resulting mixture was then saturated with iodine and sulfur dioxide. During the process, the viscosity and surface tension of the solution decreased markedly, and reached the point where bubbles no longer broke at the surface of the solution, but the solution was merely agitated by the escaping excess sulfur dioxide. The concentration of $I_2$ was estimated to be 2.9 molar; that of $SO_2$ 3.4 molar, and that of LiI 1.1 molar, based on the weights and volumes of the reagents and the final mixture. This example shows that sulfur dioxide increases the solubility of the intended product of a fuel cell reaction, namely lithium iodide, that iodine has a high solubility in the medium, and that iodine and sulfur dioxide act together to decrease the viscosity and surface tension of the electrolyte.

EXAMPLE II

Forty milliliters of propylene carbonate and ten milliliters of ethylene carbonate were added to a glass cell, fitted with sealed electrode holders. Six grams of anhydrous lithium iodide were added and sulfur dioxide was led into the inner cell compartment through a glass tube in a special fitting until the lithium iodide had completely dissolved. Three grams of iodine were then added to the mixture, and dissolved with agitation. A small piece of lithium, 20 mils thick $\times 1 \frac{1}{4} \times 1 \frac{1}{4}$ long was pressed into a stainless steel screen, which served as the anode. The cathode electrode was a piece of porous graphite, immersed in the solution such that an area 2 cm by 3 was exposed to the electrolyte. The graphite was 4 mm thick, and placed parallel to any of the internal parts was noted. The following characteristics were then recorded at ambient temperature:

| CURRENT | POTENTIAL |
|---|---|
| 0 | 3.01 v |
| 1.1 ma | 3.00 v |
| 10.52 ma | 2.84 v |
| 50 ma | 1.95 v |
| −3 ma (charge) | 3.11 v |
| −10 ma (charge) | 3.21 v |

After passing a charging current of 10 ma through the cell for several hours, dendritic lithium was found on the lithium foil, on the stainless screen, and floating in the electrolyte. Prolonged discharge of the cell through a 270 ohm resistor (3 days) discharged the iodine color, and only the yellow color of the sulfur dioxide - lithium iodide remained. No metal parts had corroded to any noticeable degree, and excess lithium metal remained on the stainless screen. The cell was charged again at the same current density, with the same potential rise noted and with dendritic lithium forming on the stainless screen.

This example demonstrates that the lithium anode is not corroded in the medium containing elemental iodine and sulfur dioxide, and that lithium can even be recoved from such an electrolyte while elemental iodine is present. It also demonstrates that the graphite electrode was at no time passivated or fouled due to the build-up of insoluble products. Further, the disappearance of the iodine color and the sharp decrease in the cell terminal potential demonstrates that elemental iodine was discharged or reduced on the fuel cell electrode.

SUMMARY OF INVENTION

It will be noted from the specification and from the examples that this invention makes possible certain marked improvements in fuel cell operation. First, the halogen oxidant need not be stored in an external reservoir. However, such a storage arrangement is not precluded. Further, this invention makes possible the operation of halogen-fueled fuel cells for extended periods of time without the necessity of providing mechanical means for removal of the products of the cell reaction or to provide an external crystallization means for the solute. While such means may be desirable for extended operation of the fuel cells, involving replenishing of the active metal anodes, only if such extended replenishment schemes are used is it necessary to provide means for removing the cell reaction products.

The present invention also permits a limited recycling and recharging of the cell. The only limitation with regard to the recycling and recharging is the qualification that reduced active metal dendrites should not be allowed to separate from the anodes support in a manner that will engender bridging of a conductive electronically conductive pathways between the cathode element and the anode.

What is claimed is:

1. A fuel cell comprising a porous cathode element for introducing a cathodic halogen; a source of halogen for said cathode; an active metal anode; and an organic electrolyte in contact with said anode and said cathode, said organic electrolyte comprising an anhydrous polar organic liquid solvent having dissolved therein an anhydrous inorganic halide salt of said active metal and sulfur dioxide.

2. The fuel cell according to claim 1 wherein the organic solvent is selected from the group consisting of dimethyl formamide, dimethyl sulfoxide, methyl and butyl formates, gammabutyrolactone, ethylene and propylene carbonates, tetrahydrofuran, 1,2-dimethozy ethane, methyl and ethyl cabonates and acetates, and mixtures thereof.

3. The fuel cell according to claim 2 wherein said inorganic salt is selected from the group consisting of the chlorides, bromides, iodides, tetrachloroaluminates,, perchlorates, tetrafluoroborates, hexafluorophosphates, and hexafluoroarsenates of said active anode metal.

4. The fuel cell according to claim 2 wherein the active anode metal is selected from the group consisting of lithium, calcium, magnesium, aluminum and alloys thereof with each other and alloys thereof with a metal selected from the group consisting of tin, antimony, mercury and zinc.

5. The fuel cell according to claim 2 wherein said electrolyte is saturated with respect to said sulfur dioxide.

6. The fuel cell according to claim 2 containing additionally dissolved therein the halogen cathodic material.

7. The fuel cell according to claim 6 wherein the halogen is selected from the group consisting of chlorine, bromine, and iodine.

8. The fuel cell according to claim 2 wherein said halogen is iodine.

9. The fuel cell according to claim 8 wherein said active metal is lithium.

10. The fuel cell according to claim 2 wherein said active metal is above hydrogen in the electrochemical series.

11. The fuel cell according to claim 2 wherein said electrolyte, having said halogen dissolved therein, is introduced into said fuel cell through the pores in the porous cathode element.

* * * * *